(12) United States Patent
Tallberg et al.

(10) Patent No.: US 7,883,399 B2
(45) Date of Patent: Feb. 8, 2011

(54) METHOD FOR PRODUCING A NETTED CASING

(75) Inventors: Roland Tallberg, Hanko (FI); Joakim Elfström, Tammisaari (FI); Esa Hihnala, Lohja (FI); Jan Dijkstra, Rutenbrock (DE)

(73) Assignee: Viskoteepak Belgium NV, Lommel (BE)

( * ) Notice: Subject to any disclaimer, the term of this patent is extended or adjusted under 35 U.S.C. 154(b) by 0 days.

(21) Appl. No.: 11/992,199

(22) PCT Filed: Oct. 3, 2006

(86) PCT No.: PCT/FI2006/050424
§ 371 (c)(1),
(2), (4) Date: May 15, 2008

(87) PCT Pub. No.: WO2007/039670
PCT Pub. Date: Apr. 12, 2007

(65) Prior Publication Data
US 2009/0075575 A1    Mar. 19, 2009

(30) Foreign Application Priority Data
Oct. 4, 2005 (FI) .................................. 20055534

(51) Int. Cl.
*A22C 13/00* (2006.01)
*A22C 13/02* (2006.01)
(52) U.S. Cl. .......................................... 452/21; 452/25
(58) Field of Classification Search ................... 452/21, 452/23–25, 27–28
See application file for complete search history.

(56) References Cited

U.S. PATENT DOCUMENTS

| | | | | |
|---|---|---|---|---|
| 2,922,186 A * | 1/1960 | Laurence | ...................... | 452/35 |
| 3,726,059 A * | 4/1973 | Cherio et al. | .................. | 53/64 |
| 4,734,956 A * | 4/1988 | Frey et al. | ................. | 138/118.1 |
| 5,024,041 A | 6/1991 | Urban et al. | | |
| 5,980,374 A | 11/1999 | Mercuri | | |
| 7,051,415 B2 * | 5/2006 | Pinto et al. | .................. | 29/455.1 |
| 7,063,610 B2 * | 6/2006 | Mysker | ....................... | 452/30 |
| 2004/0047951 A1 | 3/2004 | Johansson | | |
| 2005/0032470 A1 * | 2/2005 | Lopez | ......................... | 452/35 |

(Continued)

FOREIGN PATENT DOCUMENTS

DE    1 217 238    5/1966

(Continued)

*Primary Examiner*—David J Parsley
(74) *Attorney, Agent, or Firm*—Birch, Stewart, Kolasch & Birch, LLP

(57) ABSTRACT

Methods for combining a tubular net with a carrier casing are disclosed. Air is blown into a carrier casing so that it is inflated to have a circular diameter. The inflated carrier casing is pulled in the direction of a tubular net toward a pleating head. The tubular net has holes and an open end of the tubular net is attached to a clamp. The inflated carrier casing is fed into the tubular net while pulling the net inside out over itself. The inflated carrier casing covered by the tubular net is pulled through the pleating head (which constricts the carrier casing) toward a shirring machine that includes the shirring mandrel. Air is blown from inside the shirring mandrel at a pressure that forces at least some areas of the carrier casing between the holes of the net to form protruding bulges, and the net/carrier casing combination is shined.

31 Claims, 2 Drawing Sheets

U.S. PATENT DOCUMENTS

2005/0101240 A1   5/2005   Mysker

FOREIGN PATENT DOCUMENTS

| | | |
|---|---|---|
| DE | 28 01 545 A1 | 7/1979 |
| DE | 3814173 A1 | 11/1988 |
| EP | 1 378 170 A1 | 1/2004 |
| FI | 891392 | 9/1989 |
| FI | 114280 B | 7/2002 |
| WO | WO-95/30334 A1 | 11/1995 |

* cited by examiner

METHOD FOR PRODUCING A NETTED CASING

TECHNICAL FIELD

The invention relates to a method for applying a tubular net having a regular or irregular shape over a carrier casing without using glues or adhesive components. The food casing thus produced, covered by a net, may be shirred to give a compact tube or a stick ready for use in the production of food such as meat, fish, dairy and vegetable products.

PRIOR ART

Food casings or skins covered by tubular cylindrical nets with invariable diameters are traditionally used for products of the ham and salami type, the function of the surrounding net being originally to improve the mechanical properties, such as strength, of a natural intestine used as the casing. With respect to mechanical properties, artificial food casings and skins used at present are normally sufficiently resistant, and thus such covering nets primarily serve to provide an aesthetic appearance, such as a rustic impression for the product. Decorative e.g. wavy patterns may be provided on the outer edge of the slices when a sausage product having a covering net is sliced.

Elastic and stretchable materials are typically used as carrier casings, including e.g. collagen and cellulose casings. During stuffing of netted food casings for instance with sausage emulsion, the carrier casing is stretched, while the non-stretchable net over the carrier casing is constricted. The carrier casing thus bulges through the spaces in the net due to the stuffing pressure of the sausage emulsion, and accordingly bulges are formed between the meshes, separated by groove-like dimples. For this reason, nets are generally permanently attached to the surface of the carrier casing using process aids such as glues to keep the net attached to the carrier casing.

Several prior art methods for the adhesion of net structures on carrier casings are known. DE 2801545 discloses a cylindrical sausage casing comprising a net structure impregnated with collagen, said net being adhered to the surface of the carrier casing using a collagen dispersion. DE 1217238 presents a cylindrical sausage casing comprising cellulose, polyamide or polyester having a tubular net adhered thereon with starch, glue, gelatine or casein solution.

Patent application FI 891392 discloses a cylindrical artificial sausage casing comprising a carrier casing based on polyamide or polyester, preferably a cellulosic casing, optionally reinforced with fibres. There is a covering net on the carrier casing to be adhered to the surface thereof with a reaction adhesive, polyurethane adhesives comprising at least one polyisocyanate component and at least one polyol component being mentioned as preferable reaction adhesives. During the production of the casing, the inner surface of the covering net is coated with a sufficient amount of the reaction adhesive to provide individual fibres of the covering net totally coated or impregnated with the adhesive. Thereafter, the covering net is caused to adhere to the surface of the tubular carrier.

EP 1378170 discloses a double food casing to be used for sausage production. A carrier casing is shirred on a cylindrical support member, said casing having thereon a separating layer or sheet, covered with a separate shirred tubular net. The shirred carrier casing and shirred net are thus separated from each other with an intermediate layer.

U.S. Pat. No. 5,024,041 discloses an apparatus for stuffing a tubular casing with sausage product, wherein a shirred carrier casing is directly mounted on a stuffing horn, whereas a shirred net casing is mounted on a separate coaxial outer tube surrounding the stuffing horn. During stuffing, said separated shirred carrier casing and the net come over one another.

In the prior art methods for producing combinations of separate nets and carrier casings, the net is typically attached with a suitable adhesive or adhesion method to the carrier surface. These combinations of nets and carrier casings thus produced have several drawbacks. Compounds used for adhesion are often based on cyanates, or are corresponding adhesives of the D4 class, generally considered hazardous for the environment and health of the practitioner. Further, additional process steps such as feeding, mixing, dispensing and drying of the adhesive are necessary for the adhesion, requiring particular apparatuses consuming energy and causing costs. In addition, it is impossible to shirr such combinations of nets and carrier casings thus produced without prior wetting, said wetting being an additional process step that may lead to weakening of the adhesion, and even loosening of the net, and moreover, the casing may thus be exposed to microbiological contamination.

In various other prior art methods, the net is typically attached to the surface of the casing only during the stuffing and production of the food product, and in this case, a separately shirred tubular net and a separately shirred carrier casing are used. In case the shirred casing and the shirred net are mounted on the same stuffing horn one behind the other, the length of the shirred casing will be a problem. In a solution where a shirred net is pulled over a shirred carrier casing, the elasticity of the net used should be sufficient to provide an inner diameter greater than the outer diameter of the shirred carrier casing. This solution, however, only results in modest depressions on the surface of the food product, not in the desired visual impression given by bulges.

Based on the above teachings it may be seen that there is an obvious need for a method for producing a combination of a carrier casing and a net without adhesives or adhesion, said combination being shirrable to give shirred sticks and suitable as such for direct stuffing with food emulsions.

OBJECTS OF THE INVENTION

An object of the invention is to provide a method for combining a tubular net having a regular or irregular shape with a surface of a carrier casing without any adhesive.

Another object of the invention is to provide a method for producing a shirred combination of a net and a carrier casing, said shirred combination being suitable as such for the production of food products, and further, a product produced with this method.

Characteristic features of the methods are presented in the claims.

The term "carrier casing" refers here to a casing or skin applied immediately on the food emulsion, in direct contact therewith.

The term "stick" refers here to a compact tube consisting of a long shirred tubular article such as sausage casing.

SUMMARY OF THE INVENTION

The invention relates to a method for combining a tubular net having a regular or irregular shape with a surface of a carrier casing without any adhesive. The invention is further directed to a method for producing a shirred combination of a net and a carrier casing, said shirred combination being suitable as such for the production of food products, e.g. meat, fish, dairy, and vegetable products. Sausages, hams, cheeses and the like may be mentioned as exemplary food products.

BRIEF DESCRIPTION OF DRAWINGS

A preferable embodiment of the inventive method is shown in appended FIG. 1, whereas

The appended FIG. 2 is an exemplary illustration of the step described above with reference to FIG. 1 where the ribbon 60, that is, the constricted combination of the casing and the net, leaves the pleating head and moves to the loading cylinders 110 of the shirring machine, and is further fully inflated with air and shirred in the shirring end 120 of the shirring machine. Said casing/net combination 60 is tightened in longitudinal direction, the casing and the net thus having equal lengths. Once the combination is inflated after leaving the cylinders 110, the length of the net is reduced owing to the net structure, thus forcing the excessive casing to bulge through the meshes, and accordingly, also the length of the carrier casing is reduced depending on the sizes of the bulges formed at the meshes of the net. The reduction of the length of the net varies according to the type, mesh sizes, and mesh shapes of the net used, and the like, and may be adjusted in the shirring machine to obtain the desired result. The length of the resulting casing combination is typically less than the length of the original casing used to make it. In the figure, L represents the length of the carrier/net combination as a flat ribbon and l represents the length of the inflated combination where the carrier forms bulges through the meshes of the net. In this example, $l=0.75 \times L$.

DETAILED DESCRIPTION OF THE INVENTION

Figure 1:
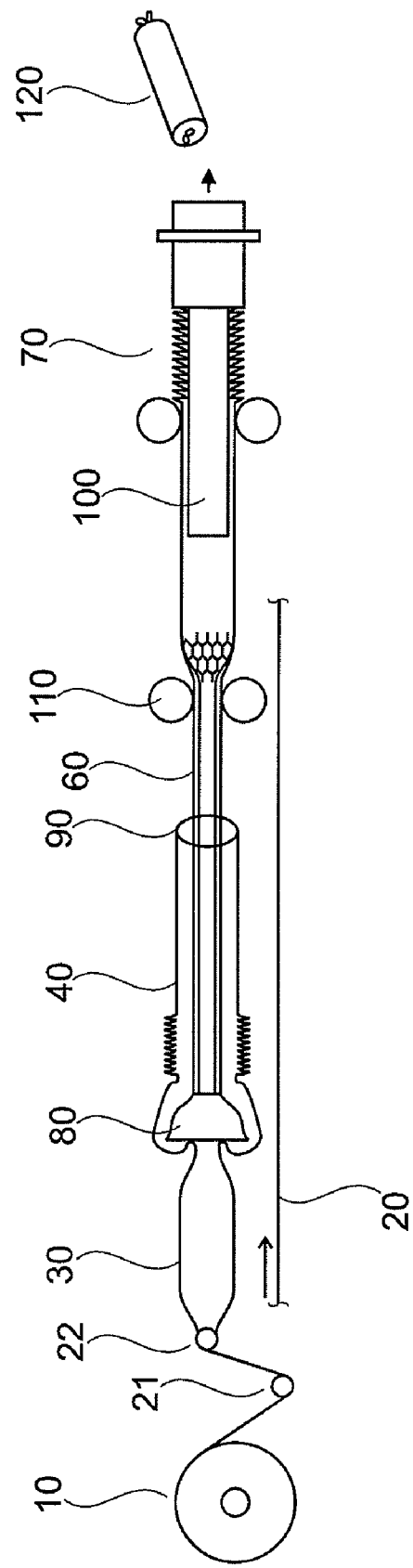
In FIG. 1, a reeled carrier casing 10 is reeled off and pulled over cylinders 21 and 22 along the line 20 by means of rolls or the like towards a tubular net 40 coming from the opposite direction, and is inflated using air or another inert gas blown in the opposite direction relative to the movement of the carrier casing 10. The carrier casing 30 inflated/pressurized to have a circular circumference is passed/pulled towards a pleating head 80 attached to the tubular net 40, said tubular net being fastened at the open end thereof to a clamp 90 coaxial with the shirring mandrel 100. Then the carrier casing 10 inflated to be round is uniformly and regularly pleated into the tubular net while the net 40 is pulled inside out over the casing, followed by pulling the combination of the net and the carrier casing through the tubular net by means of the loading cylinders 110 of the shirring machine 70. A respective pleating head 80 is designed for each net/casing quality, said head comprising a conical constrictor preferably having a passage with a size of the cross-section area of the compressed combination of the net and the carrier casing. The cross-section of the passage is preferably star-shaped. The carrier casing covered by a net exits the pleating head 80 in the form of a narrow tubular rope, or ribbon 60 and passes to the loading cylinders 110 of the shirring machine 70. Said loading cylinders 110 preferably feed a sufficient amount of the netted casing to the feeding rolls to prevent the finished netted casing from bending. Air pressure blown from inside of the shirring mandrel 100 of the shirring machine 70 forces the areas of the carrier casing 10 between the meshes of the net 40 to protruding bulges, and finally the food casing covered by the net is shirred by the machine to give compact sticks, which are cut by a cutter to yield desired lengths.
Figure 2:
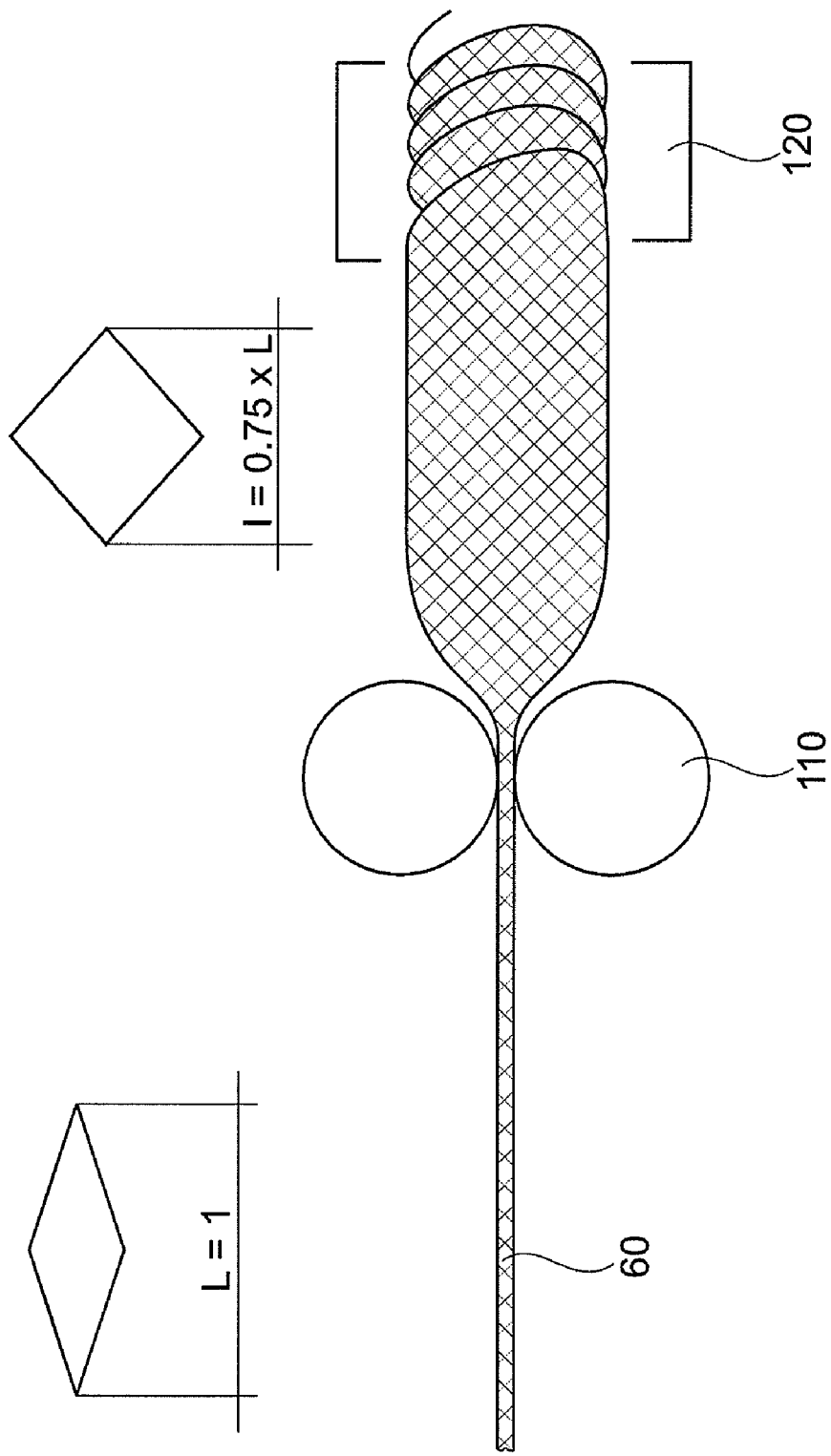
FIG. 2 illustrates the step shown in FIG. 1 for inflating the combination.

It was surprisingly found that a tubular net having a regular or irregular shape may be combined in a controlled and permanent manner with the surface of a carrier casing without an adhesive or adhesion procedures, followed by shirring of the net/casing combination to give a compact stick. The properties of the net/casing combination are not altered since no adhesive treatment with subsequent drying is needed. A net/carrier casing combination is thus obtained where the form and the location of the desired bulges (protrusions or blisters) of the carrier casing are also retained during the production of the food product, thus yielding the desired final result. Moreover, said shirred net/carrier casing combination is ready for stuffing as such.

The method of the invention comprises the following steps:

Air or another inert gas is blown into the carrier casing, followed by pulling the carrier casing inflated to have a circular cross-section through a pleating head attached to a tubular net, said net being attached at the open end thereof to a clamp coaxial with the shirring mandrel, followed by uniform and regular folding/pleating of the carrier casing into the tubular net, while the net is drawn inside out over the carrier casing, and the net/carrier combination is pulled to the shirring machine. In the shirring machine, the pressure of air or an inert gas blown from inside of the shirring mandrel forces the areas between the meshes to form protruding bulges, and finally the net/carrier casing combination is shirred by the machine to yield compact sticks. In the method of the invention, the carrier casing may be on reels or in the form of a straight flat ribbon or in any other suitable form. Any inert gas may be used for inflating the carrier casing and for shirring in the shirring machine, said inert gas being preferably air.

The tubular net is fastened at the open end thereof, towards which the carrier casing moves, to a clamp centralizing the tubular net with the shirring mandrel of the shirring machine.

A pleating head specifically designed for each net quality/calibre range/casing quality is attached to the other end of the tubular net, said pleating head comprising a constrictor portion, a tube fastened thereto and a rear element for attaching the tubular net to the pleating head. In addition, a conical constrictor is formed at the pleating head, having an angle of 5 to 89°, preferably 15 to 50° and a boring, said boring preferably having a size of the cross section area of the compressed net/casing combination. The diameter of the boring is from 4 to 30 mm, preferably from 8 to 15 mm, particularly for netted casings of 57 to 100 mm. The diameter of the pleating head is preferably greater than that of the tubular net. For instance, a pleating head with an outer diameter of 46 mm is used for tubular nets having diameters of 33.9 mm. The purpose of the pleating head is to dilate the tubular net in a controlled manner, to constrict and pleat the carrier casing inflated to be round to give a uniformly pleated (longitudinally folded) rope or ribbon, and to orientate the net and the casing together.

The diameter of the carrier casing is at least equal to the maximum diameter of the covering net, preferably at least 2% greater that the maximum diameter of the covering net. As the difference between the diameter of the carrier casing and the maximum diameter of the covering net increases, the bulges or protrusions obtained at each mesh of the net after stuffing the casing get higher, and accordingly more distinctive patterns are obtained on the surface of the finished product.

The net or a net cover comprises a net stocking, preferably a seamless net stocking or tube with meshes or holes. The net may have the form of a regular tube, or the form thereof may be irregular such as oval or comprise wider and narrower regions at desired locations. The net may be produced or woven using any known net production method, preferably a weaving method for producing nets with meshes. All known knitting methods suitable for weaving nets are particularly preferable. The net has meshes of polygonal shape, such as rhombic, square, triangular, hexagonal, octagonal, decagonal and dodecagonal meshes, or of circular or oval shape.

The material of the net may be any fibre of food quality. Suitable fibres include cotton, linen, viscose, polyamide, polyester, polyolefin, for instance polyethylene, and cellulose. The net may be endowed with elasticity using elastane, for instance elastane fibres.

The net cover may be produced from single fibres or from several fibres wound together according to the use, and whether high bulges, low bulges or no bulges at all are desired on the surface of the product. Suitable mixtures include the combination of cotton, polyethylene and elastane, and the combination of cotton and polyethylene. The net may also contain coloured fibres, dyed preferably with any food grade dyes.

Known apparatuses of the prior art suitable for the method of the invention may be used. Shirring machines known in the art may be used, and further, shirring techniques known for shirring machines may be applied in the method. A cutter of the rotating saw type is a preferred cutter.

The carrier casing may be any tube in the form of a seamless hose. Suitable carrier casings include casings or skins based on synthetic or natural materials, suitable for food casing applications. A casing based on collagen or a cellulose may preferably be used as the carrier casing in the method of the invention, wherein said cellulosic casing may be a fibre reinforced casing, for instance a casing reinforced with paper, alginate paper, sisal or hemp. In case of these carrier casings, they are premoisturized prior to the process using known moisturizing methods, and moisture may also be added during shirring.

The carrier casing may also be a known plastic casing according to the prior art, comprising a polymer known for food casings or combinations of several polymers. Plastic casings preferably consist of food grade thermoplastic polymers. Said plastic casings comprise at least one, or several layers and preferably one layer. No premoisturizing of the plastic casing is needed prior to, or during the process.

The polymer may be selected from the group consisting e.g. of polyamides, PVDC, EVOH, EVA, EMA, EEA, polyolefins, polyesters, polyurethanes, and the modified derivatives and block copolymers of the above polymers.

Preferable block copolymers include block copolymers with polyether and polyamide blocks. Carrier casings may comprise at least one polymer (a) with polyamide blocks and polyether blocks. Carrier casings may also comprise a combination of at least one polyamide (b) and a polymer (a) with polyamide blocks and polyether blocks.

Suitable polyamides (b) may be selected from the group comprising the polyamides PA6 (Nylon 6), PA11 (Nylon 11), PA12 (Nylon 12), PA66 (Nylon 66), PA6.12 (Nylon 612), PA6/66 (Nylon 6/66), PA6/12 (Nylon 6/12), PA6/69 (Nylon 6/69), polyamides containing MXDA, particularly aromatic polyamides and mixtures of the above polyamides.

Suitable polymers (a) containing polyamide blocks and polyether blocks may be selected from the group comprising thermoplastic polymers comprising polyether chains that may be side chains (copolymer B) or blocks (or sequences) in the main chain (copolymer A), or may be present as side chains or blocks.

Examples of the polymers comprising polyether side chains include e.g. copolymers of ethylene and polyalkyleneglycol (meth)acrylate. Examples of the polymers A comprising polyether blocks include e.g. a copolymer (A) referring to a block copolymer comprising bound polyoxyalkylene chains and other polymer chains bound together, or a polymer having polyoxyalkylene chains joined together via linking regions.

The polyether blocks comprise alkylene oxide units that may be selected from the group consisting of ethylene oxide, propylene oxide or the group $-CH_2-CH_2-CH_2-CH_2-O-$. Water vapour permeability is increased by increasing the proportions of polyether, depending on the nature thereof. Water vapour permeability increases with increasing amounts of polyethylene glycol.

The polyether blocks may comprise from 5 to 85% of the weight of (A). The polyether blocks may also comprise other units than ethylene oxide units, for instance propylene oxide or polytetrahydrofuran, thus yielding polytetramethylene glycol bonds. It is also possible to simultaneously use PEG blocks or blocks that consist of ethylene oxide units, PPG blocks or blocks that consist of propylene oxide units, as well as PTMG blocks or blocks that consist of tetramethylene glycol units, also known as polytetrahydrofuran blocks. PEG blocks, or blocks obtained by oxyethylation of bisphenols, such as bisphenol A, are preferably used. The amount of the polyether blocks (A) varies preferably from 10 to 50% by weight, relative to (B).

The polyamide blocks consist of polyamide 6 or polyamide 12, and preferably polyamide 6.

The number average molecular weight of the polyamide sequences varies from 300 to 15000, preferably from 600 to 5000. The molecular weight of the polyether sequences is preferably from 100 to 6000, preferably from 200 to 3000.

The polyether is a polyethylene glycol (PEG) or polytetramethylene glycol (PTMG), also known as polytetrahydrofuran (PTHF), preferably polyethylene glycol (PEG).

The polymer comprising polyamide blocks and polyether blocks preferably has polyamide blocks and polyether blocks of a single type. Polymers comprising PEG blocks, having water vapour permeabilities greater than those of polymers comprising PTMG blocks, may be used. A mixture of said polymers comprising polyamide blocks and polyether blocks is also useful.

The polymer comprising polyamide blocks and polyether blocks preferably contains polyamide as the major component by weight, that is, the amount of the polyamide present as blocks and optionally statistically distributed along the chain comprises 40% or more of the weight of the polymer comprising polyamide blocks and polyether blocks. The ratio of the amount of the polyamide to that of polyether (polyamide/polyether) is preferably 1/1 to 3/1.

In case it is desirable to produce a breathing food casing from a thermoplastic polymer, the carrier casing is produced from a polymer comprising polyamide blocks and polyether blocks, further having a water vapour transmission rate (MVTR) of more than 200 $g/m^2/24$ hours, preferably more than 400 $g/m^2/24$ hours, as measured by the ASTM E96 BW method.

In case it is desirable to produce a smokable food casing from a thermoplastic polymer, the carrier casing preferably comprises a polymer (a) having polyether blocks and polyamide blocks, further having a water vapour transmission rate (MVTR) of more than 100 $g/m^2/24$ hours, preferably 250-20 000 $g/m^2/24$ hours, as measured by the ASTM E96 BW method.

In a preferable embodiment, the smokable polymeric carrier casing contains from 15 to 85% by weight, preferably from 50 to 70% by weight of polyamide (b) or a mixture of polyamides (b), and between 15 and 85%, preferably between 30 and 50% by weight of the polymer (a) with polyamide blocks and polyether blocks, or a mixture of said polymers (a). This smokable carrier casing preferably comprises PA6 or PA6/66 as the polyamide (b), and a polymer (a) with PA6 polyamide blocks and PEG polyether blocks, said polymer (a) being hydrophilic and having a high water vapour transmission rate (MVTR) of more than 100 g/m$^2$/24 h, preferably between 250 and 20 000 g/m$^2$/24 h. The polymer (a) may also be based on PA6 polyamide blocks and PTMG polyether blocks, or a mixture of said polymers (a) may be used.

The polymeric carrier casing may be produced with any known method of the prior art, such as with an extrusion method. A homogeneous melt is produced from the polymer(s), followed by extrusion of this melt through an annular die to give a seamless tube, stretching of the tube in axial and transverse direction, and, if desired, a heat treatment thereof to adjust the shrinkage to the desired range. Mixing and melting may also be carried out in separate mixing extruders. The polymeric carrier casing comprises a single layer or several co-extruded layers consisting of identical or different polymers.

The method of the invention results in a shirred net/carrier casing combination consisting of a net and a carrier casing, the net being combined with the outer surface of said carrier casing without adhesives or process aids, and further, the combination is shirred.

It is surprising that the net/carrier casing combination comprising a net attached without any adhesive, and produced with the method of the invention, is stable without the net peeling off during the production, cooking or storage of the food product. Food products such as hams and sausages having distinct bulges on the surface may thus be produced, the shape and size of the bulges being adjustable as desired, respectively.

The ability to provide any desired surface pattern to the food product, e.g. surface pattern resembling a honeycomb, without necessarily using an adhesive for attaching the net is particularly surprising. As desired, net/carrier coating combinations having different sizes and shapes, diameters/calibres, and surface patterns, respectively, may be produced with the method of the invention. The length of the shirred stick may be freely chosen according to the wishes of the respective final user, that is, the food producer. The shirred net/carrier coating combination of the invention may be stuffed with food pastes, e.g. sausage emulsions, using commonly known packaging and stuffing tools.

Suitability of any known food casing, plastic casing and ordinary fibre reinforced cellulosic casing as the carrier casing is surprising. Very user-friendly shirred net/carrier casing combinations ready for use, and suitable for any conventional stuffing machine are thus obtained. Less starting materials are needed in the method of the invention in comparison with the production of casings using adhesives, and moreover, any suitable nets such as low-price plastic nets may be used. Productivity of the method is considerably higher than that of the prior art methods.

The product, i.e. the shirred stick, may be readily stored, the storage life thereof being improved since no adhesives nor numerous wetting steps are needed in the production thereof. In addition, there are no stripes or smoky odour, nor other defects typically encountered in products produced with prior art processes due to irregularities. Since no drying step of the adhesive is necessary, the energy consumption is considerably reduced, and there are considerably fewer problems concerning the control of humidity especially for shirred products. Since numerous wetting steps are not used in the production of the product, potential problems concerning hygiene are reduced both in the production of the shirred product and in the product itself. Further, the humidity of the shirred product may be readily adjusted as desired to improve the storage life of the product. If necessary, the net/carrier casing combinations produced with the method of the invention may be directly used by the food product manufacturer without prior steeping or wetting, but the combination may also be wetted or steeped like similar conventional carrier casings prior to stuffing, particularly in cases where the moisture content of the product is adjusted to a low level.

The invention claimed is:

1. Method for producing a shined food casing covered by a net, wherein air or an inert gas is blown into the carrier casing, said method comprising:
    inflating a carrier casing to have a circular diameter;
    pulling the inflated carrier casing in the direction of a tubular net towards a pleating head having a conical constrictor, wherein the tubular net comprises meshes and an open end of the tubular net is attached to a clamp that is both (a) coaxial with a shirring mandrel and (b) located between the pleating head and the shirring mandrel, the inflated carrier casing being thus fed into the tubular net while pulling the net inside out over itself to form a net/carrier casing combination;
    pulling the net/carrier combination through the pleating head toward a shirring machine that comprises the shirring mandrel, wherein air or an inert gas is blown from inside the shirring mandrel at a pressure that bulges at least some areas of the carrier casing between the meshes of the net to form protrusions; and
    shirring the net/carrier casing combination with the shirring machine.

2. Method according to claim 1, wherein the carrier casing is a food grade casing or skin, which is synthetic or based on a natural material.

3. Method according to claim 1, wherein the carrier casing is a collagen casing, an alginate paper casing, or a cellulosic casing.

4. Method according to claim 2, wherein the carrier casing comprises one polymer or combinations of several polymers, and one or more polymeric layer(s).

5. Method according to claim 4, wherein the polymer is selected from the group consisting of polyamides, PVDC, EVOH, EVA, EMA, EEA, polyolefins, polyesters, polyurethanes, modified derivatives of this group of polymers and block copolymers of this group of polymers.

6. Method according to claim 1, wherein the net comprises a net stocking having a regular or irregular shape.

7. Method according to claim 1, wherein the diameter of the carrier casing is at least equal to the maximum diameter of the covering net.

8. Method according to claim 1, wherein the angle of the conical constrictor is between 5 and 89°.

9. Method according to claim 1 wherein the pleating head comprises a bore having a diameter between 4 and 30 mm.

10. Method according to claim 3, wherein the carrier casing is a fibre reinforced cellulosic casing.

11. Method according to claim 6, wherein the net comprises a seamless net stocking or a tube comprising meshes having polygonal, circular, or oval shapes.

12. Method according to claim 7, wherein the diameter of the carrier casing is at least 2% greater than the maximum diameter of the covering net.

13. Method according to claim 8, wherein the angle of the conical constrictor is between 15 and 50°.

14. Method according to claim 9, wherein the pleating head comprises a bore having a diameter between 8 and 15 mm.

15. Method for combining a tubular net with a surface of a carrier casing, wherein air or an inert gas is blown into the carrier casing, said method comprising:

inflating or pressurizing a carrier casing to have a circular diameter;

pulling the inflated or pressurized carrier casing in the direction of a tubular net towards a pleating head having a conical constrictor, wherein the tubular net comprises holes or meshes and an open end of the tubular net is attached to a clamp that is both (a) coaxial with a shirring mandrel and (b) located between the pleating head and the shirring mandrel;

feeding the inflated or pressurized carrier casing into the tubular net while pulling the net inside out over itself, the inflated or pressurized carrier casing further passing through the tubular net;

pulling the inflated or pressurized carrier casing covered by the tubular net through the pleating head thereby constricting the carrier casing and producing the net/carrier casing combination, pulling the net/carrier casing combination toward a shirring machine that comprises the shirring mandrel, wherein air or an inert gas is blown from inside the shirring mandrel at a pressure that forces at least some areas of the carrier casing between the holes or the meshes of the net to form protruding bulges; and shirring the net/carrier casing combination with the shirring machine.

16. Method according to claim 15, wherein the carrier casing is a food grade casing or skin, which is synthetic or based on a natural material.

17. Method according to claim 15, wherein the carrier casing is a collagen casing, a cellulosic casing or an alginate paper casing.

18. Method according to claim 16, wherein the carrier casing comprises one polymer or combinations of several polymers, and one or more polymeric layer(s).

19. Method according to claim 18, wherein the polymer is selected from the group consisting of polyamides, PVDC, EVOH, EVA, EMA, EEA, polyolefins, polyesters, polyurethanes, modified derivatives of this group of polymers and block copolymers of this group of polymers.

20. Method according to claim 15, wherein the net comprises a net stocking having a regular or irregular shape.

21. Method according to claim 15, wherein the diameter of the carrier casing is at least equal to the maximum diameter of the covering net.

22. Method according to claim 15, wherein the angle of the conical constrictor is between 5 and 89°.

23. Method according to claim 15, wherein the pleating head comprises a bore having a diameter between 4 and 30 mm.

24. Method according to claim 16, wherein the carrier casing is a collagen casing, a cellulosic casing or an alginate paper casing.

25. Method according to claim 16, wherein the net comprises a net stocking having a regular or irregular shape.

26. Method according to claim 17, wherein the carrier casing is a fibre reinforced cellulosic casing.

27. Method according to claim 20, wherein the net comprises a seamless net stocking or a tube comprising meshes having polygonal, circular, or oval shapes.

28. Method according to claim 21, wherein the diameter of the carrier casing is at least 2% greater than the maximum diameter of the covering net.

29. Method according to claim 22, wherein the angle of the conical constrictor is between 15 and 50°.

30. Method according to claim 23, wherein the pleating head comprises a bore having a diameter between 8 and 15 mm.

31. Method according to claim 15, wherein lengthwise pleats are created in the net/carrier casing combination as the net/carrier casing combination is pulled through the pleating head.

* * * * *